United States Patent
Ishijiki et al.

(10) Patent No.: US 12,392,400 B2
(45) Date of Patent: Aug. 19, 2025

(54) POWER TRANSMISSION DEVICE

(71) Applicant: HONDA MOTOR CO., LTD., Tokyo (JP)

(72) Inventors: Masaru Ishijiki, Saitama (JP); Chiaki Uzuki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/796,373

(22) Filed: Aug. 7, 2024

(65) Prior Publication Data
US 2025/0052307 A1  Feb. 13, 2025

(30) Foreign Application Priority Data
Aug. 7, 2023 (JP) .................. 2023-128786

(51) Int. Cl.
| | | |
|---|---|---|
| F16H 37/08 | (2006.01) | |
| F16H 48/40 | (2012.01) | |
| F16H 48/08 | (2006.01) | |

(52) U.S. Cl.
CPC ........... *F16H 37/082* (2013.01); *F16H 48/40* (2013.01); *F16H 2048/085* (2013.01)

(58) Field of Classification Search
CPC ........ F16H 37/082; F16H 37/08; F16H 48/40; F16H 2048/085; F16H 57/082
USPC ........ 475/204, 221, 230, 331, 150; 74/606 R
See application file for complete search history.

(56) References Cited

U.S. PATENT DOCUMENTS

| | | | | |
|---|---|---|---|---|
| 4,412,459 | A * | 11/1983 | Goscenski, Jr. | ........ F16H 48/34 |
| | | | | 475/221 |
| 5,728,022 | A * | 3/1998 | Schultz | ................. F16H 37/082 |
| | | | | 475/341 |
| 7,351,178 | B2 * | 4/2008 | Keuth | ................... F16H 37/082 |
| | | | | 475/221 |
| 8,585,535 | B2 * | 11/2013 | Paul | ..................... F16H 37/082 |
| | | | | 74/606 R |
| 2012/0329596 | A1 | 12/2012 | Nomura et al. | |

FOREIGN PATENT DOCUMENTS

JP  2013-007442 A  1/2013

* cited by examiner

*Primary Examiner* — Roger L Pang
(74) *Attorney, Agent, or Firm* — Paratus Law Group, PLLC

(57) ABSTRACT

A power transmission device includes a planetary gear mechanism and a differential gear mechanism, in which a differential case is formed in one piece with a planetary carrier in a state of being aligned with the planetary carrier in a rotation axis direction of the differential case, and is provided a fixing pin insertion hole through which a fixing pin for fixing a differential pinion shaft to the differential case is inserted, and the fixing pin insertion hole is provided at a position overlapping a pinion shaft insertion hole when the planetary carrier and the differential case are viewed from the rotation axis direction, one end of the fixing pin insertion hole communicates with the pinion shaft insertion hole, and another end thereof communicates with outside of the differential case on a side opposite to the planetary carrier.

1 Claim, 8 Drawing Sheets

POWER TRANSMISSION DEVICE

CROSS-REFERENCE TO RELATED APPLICATIONS

This application is based on and claims priority under 35 USC 119 from Japanese Patent Application No. 2023-128786 filed on Aug. 7, 2023, the entire content of which is incorporated herein by reference.

TECHNICAL FIELD

The present invention relates to a power transmission device.

BACKGROUND ART

In recent years, as a specific countermeasure against global climate change, efforts for realizing a low-carbon society or a decarbonized society have become active. Reduction in $CO_2$ emission and an improvement in energy efficiency in a vehicle such as an automobile are also required, and electrification of a drive source is progressing. In addition, from the viewpoint of environmental conservation, in recent years, there has been an increasing demand for reducing the number of waste components and reusing components.

JP2013-007442A discloses a technique in which a pinion gear shaft of a rear differential is disposed in an accommodating space of a differential case on an axis orthogonal to a rotation axis of the differential case, and rotation around the axis and movement in a direction along the axis are restricted by a pin.

However, in the related art described above, there is a problem that it is difficult to detach the pin for restricting rotation and movement of the pinion gear shaft from the differential case after the pin is attached to the differential case. Therefore, for example, when the pinion gear shaft is to be detached from the differential case at the time of assembling or inspection of the rear differential, a method of breaking the differential case to detach the pinion gear shaft is generally adopted, and it is difficult to reuse the differential case or the like.

An object of the present invention is to provide a power transmission device in which a fixing pin that fixes a differential pinion shaft to a differential case can be easily detached from the differential case even after the fixing pin is attached to the differential case.

SUMMARY OF INVENTION

According to an aspect of the present invention, there is provided a power transmission device including:
a planetary gear mechanism; and
a differential gear mechanism, in which
the planetary gear mechanism includes a planetary carrier provided a pinion shaft insertion hole through which a planetary pinion shaft is inserted, the planetary pinion shaft pivotally supporting a planetary gear,
the differential gear mechanism includes a differential case supporting a differential pinion shaft,
the differential case
is formed in one piece with the planetary carrier in a state of being aligned with the planetary carrier in a rotation axis direction of the differential case, and
is provided:
a differential pinion shaft insertion hole through which the differential pinion shaft is inserted, the differential pinion shaft insertion hole being orthogonal to a rotation axis of the differential case; and
a fixing pin insertion hole through which a fixing pin is inserted, the fixing pin insertion hole being parallel to the rotation axis of the differential case and orthogonal to the differential pinion shaft insertion hole, and the fixing pin fixing the differential pinion shaft inserted in the differential pinion shaft insertion hole to the differential case, and
the fixing pin insertion hole is provided at a position overlapping the pinion shaft insertion hole when the planetary carrier and the differential case are viewed from the rotation axis direction, one end of the fixing pin insertion hole communicates with the pinion shaft insertion hole, and another end thereof communicates with outside of the differential case on a side opposite to the planetary carrier.

DESCRIPTION OF EMBODIMENTS

Figure 1:
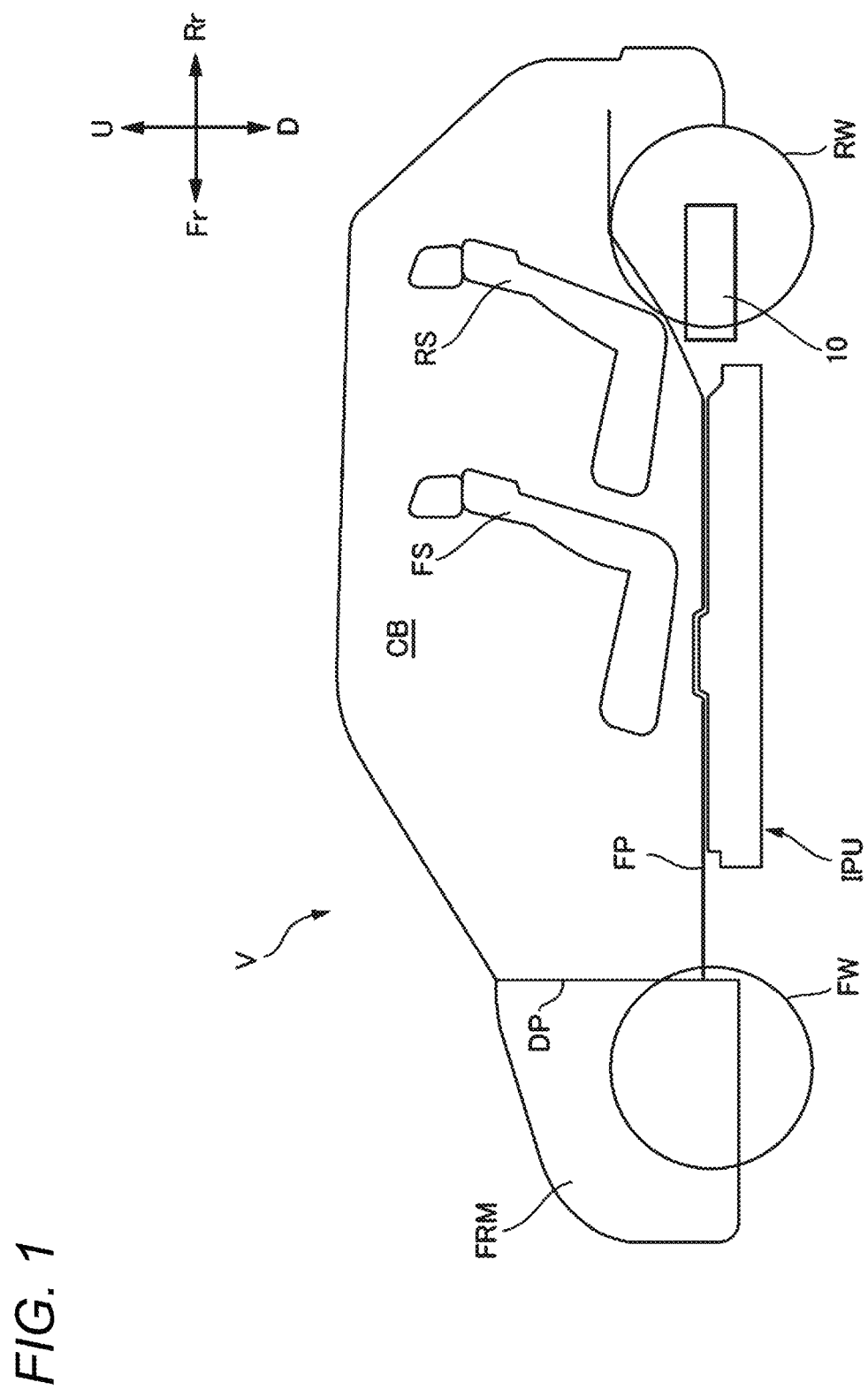
FIG. 1 is a schematic view as viewed from a left side of a vehicle V on which a drive unit 10 that is an embodiment of a power transmission device of the present invention is mounted.

Hereinafter, a vehicle on which a drive unit (a drive unit 10 to be described later) that is an embodiment of a power transmission device of the present invention is mounted will be described with reference to the accompanying drawings. Hereinafter, the same or similar elements are denoted by the same or similar reference numerals, and description thereof may be appropriately omitted or simplified. The drawings are viewed in directions of reference numerals. In the present specification and the like, in order to simplify and clarify the description, a front-rear direction, a left-right direction, and an upper-lower direction are described according to directions viewed from a driver of the vehicle, and in the drawings, a front side of the vehicle is shown as Fr, a rear side is shown as Rr, a left side is shown as L, a right side is shown as R, an upper side is shown as U, and a lower side is shown as D.

[Overall Configuration of Vehicle]

As shown in FIG. 1, a vehicle V according to the present embodiment includes a pair of left and right front wheels FW, a pair of left and right rear wheels RW, and a floor panel FP constituting a floor of the vehicle V. The vehicle V is partitioned, by a dash panel DP extending in the upper-lower direction above the floor panel FP, into a passenger compartment CB and a front room FRM in front of the passenger compartment CB. A front seat FS and a rear seat RS are provided in the passenger compartment CB.

The vehicle V includes the drive unit 10 serving as a drive source, and a battery pack IPU that stores electric power to be supplied to the drive unit 10.

The drive unit 10 is disposed behind the rear seat RS and below the floor panel FP. The battery pack IPU is disposed below the floor panel FP and below a floor of the passenger compartment CB. The battery pack IPU accommodates a plurality of battery modules in which a plurality of battery cells are stacked. Each battery cell is a secondary battery that can be charged and discharged, such as a lithium ion battery or an all-solid-state battery.

[Overall Configuration of Drive Unit]

Figure 2:
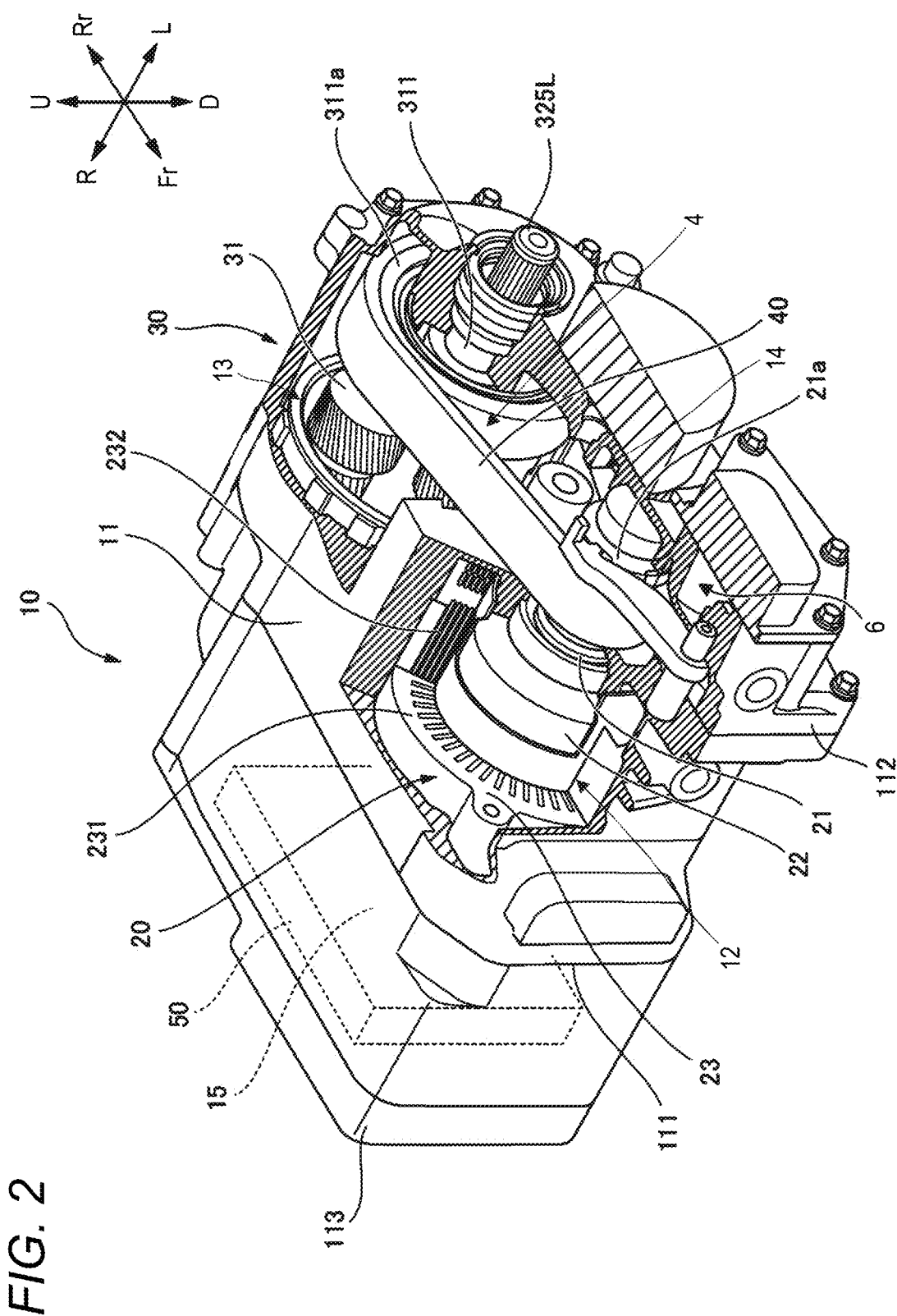
FIG. 2 is a cutaway perspective view of a part of the drive unit 10.
Figure 3:
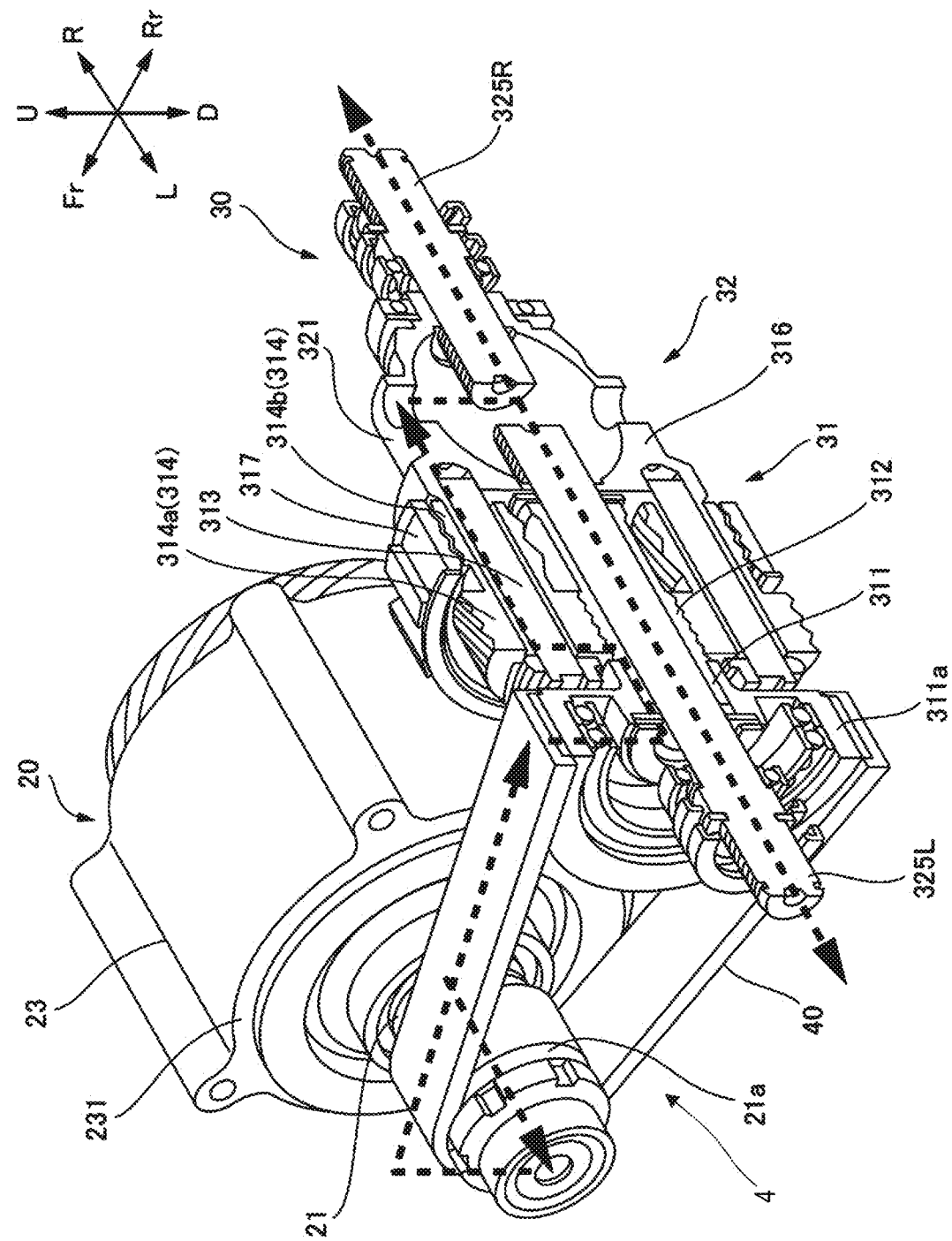
FIG. 3 is a partial cross-sectional perspective view showing a power transmission path in the drive unit 10.

As shown in FIGS. 2 and 3, the drive unit 10 includes a drive motor 20, a deceleration device 30 that reduces power output from the drive motor 20 and outputs the reduced power to the outside, a chain transmission mechanism 4 that transmits the power output from the drive motor 20 to the deceleration device 30, a control device 50 that controls the drive motor 20, a parking mechanism 6, and a drive unit case 11 that accommodates the above-described components.

The drive unit case 11 includes a main case 111, a left side cover 112 covering a left side surface of the main case 111, and a right side cover 113 covering a right side surface of the main case 111.

The drive unit case 11 includes a motor chamber 12 that accommodates the drive motor 20, a gear chamber 13 that accommodates the deceleration device 30, a chain chamber 14 that accommodates the chain transmission mechanism 4 and the parking mechanism 6, and a controller chamber 15 that accommodates the control device 50. The motor chamber 12 and the gear chamber 13 are formed side by side in the front-rear direction such that the motor chamber 12 is located on the front side and the gear chamber 13 is located on the rear side. The chain chamber 14 is formed on the left side of the motor chamber 12 and the gear chamber 13 and is formed by the main case 111 and the left side cover 112. The controller chamber 15 is formed on the right side of the motor chamber 12 and the gear chamber 13 and is formed by the main case 111 and the right side cover 113.

The drive motor 20 is a so-called inner rotor motor that includes a drive shaft 21, a rotor 22 that is attached to the drive shaft 21 and rotates integrally with the drive shaft 21, and a stator 23 that is disposed on a radial direction outer side of the rotor 22 in a manner of facing the rotor 22 in the radial direction with a slight gap therebetween.

In the present embodiment, in the drive unit 10, the drive motor 20 is disposed such that an axial direction (that is, the drive shaft 21) is horizontally oriented in the left-right direction. In this way, since the drive shaft 21 is oriented in the horizontal direction, an upper-lower dimension of the drive unit 10 can be compact.

The stator 23 includes a stator core 231 and a coil 232 that is attached to the stator core 231 and includes a plurality of windings of a U-phase, a V-phase, and a W-phase.

A drive sprocket 21a around which a power transmission chain 40 of the chain transmission mechanism 4 is wound is attached to a left end of the drive shaft 21. The drive sprocket 21a rotates integrally with the drive shaft 21.

The chain transmission mechanism 4 includes the drive sprocket 21a attached to the drive shaft 21, a driven sprocket 311a attached to an input shaft 311 of a planetary gear mechanism 31 to be described later on the same plane as the drive sprocket 21a, and the power transmission chain 40 wound around the drive sprocket 21a and the driven sprocket 311a. The driven sprocket 311a has a larger diameter than the drive sprocket 21a, and the number of teeth of the driven sprocket 311a is larger than the number of teeth of the drive sprocket 21a.

Figure 4:
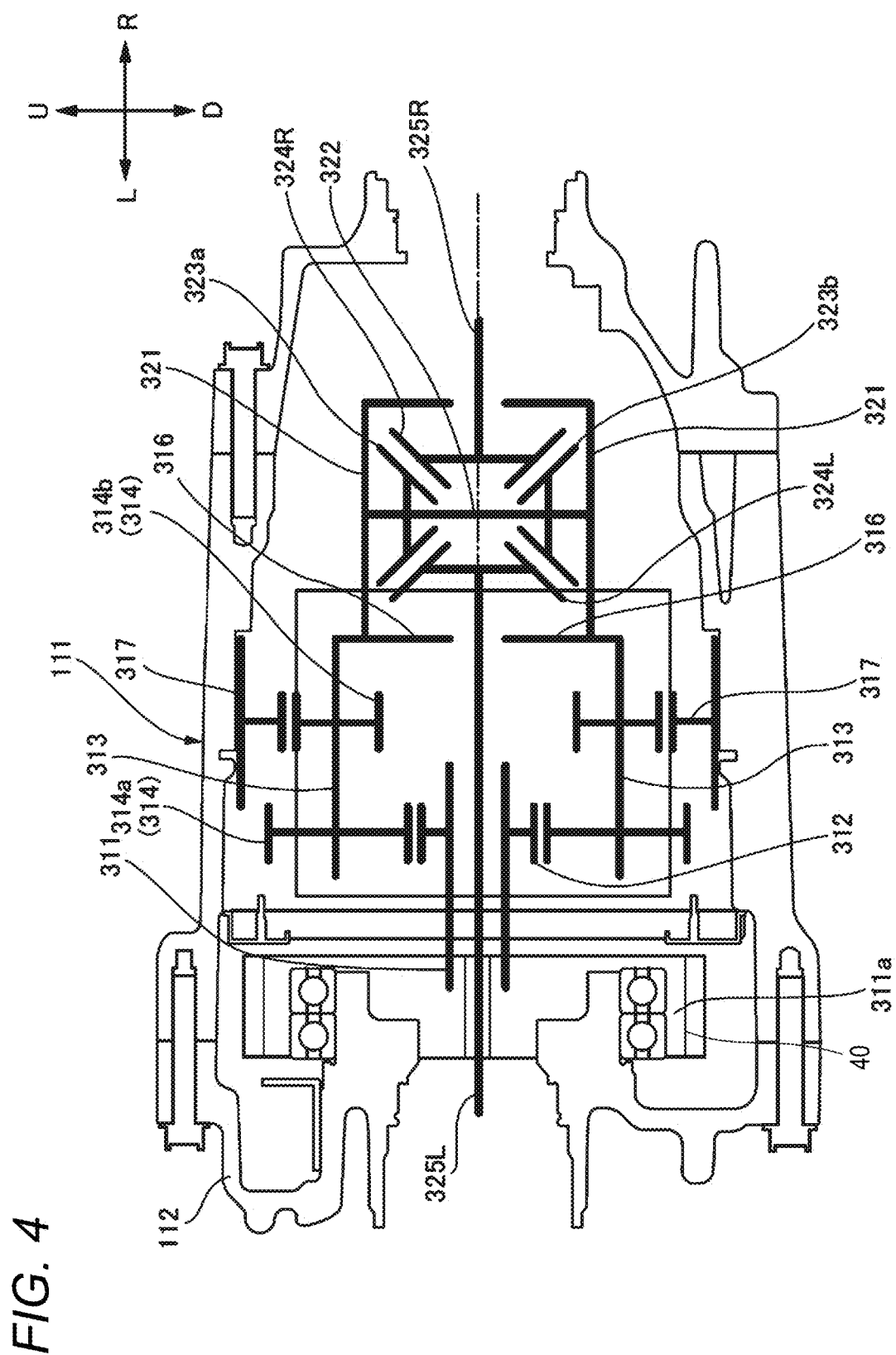
FIG. 4 is a skeleton diagram of a deceleration device 30 in the drive unit 10.

As shown in FIGS. 3 and 4, the deceleration device 30 of the drive unit 10 includes the planetary gear mechanism 31 and a differential gear mechanism 32.

The planetary gear mechanism 31 includes the input shaft 311, a sun gear 312, a plurality of planetary pinion shafts 313, the same number of stepped pinions 314 as the planetary pinion shafts 313, a planetary carrier 316, and a ring gear 317.

In the present embodiment, the planetary gear mechanism 31 is aligned behind the drive motor 20 in the front-rear direction. The planetary gear mechanism 31 is disposed such that an axial direction (that is, the input shaft 311) is parallel to the axial direction of the drive motor 20 and is oriented in the left-right direction. The input shaft 311 of the planetary gear mechanism 31 is disposed at substantially the same height as the drive shaft 21 of the drive motor 20 in the upper-lower direction. Further, an outer diameter dimension of the planetary gear mechanism 31 is substantially the same dimension as an outer diameter dimension of the drive motor 20, and a height of the drive unit 10 is small in the upper-lower direction.

The input shaft 311 is a hollow shaft into which a left drive shaft 325L to be described later is inserted. The driven sprocket 311a around which the power transmission chain 40 of the chain transmission mechanism 4 is wound is attached to a left end of the input shaft 311. The driven sprocket 311a rotates integrally with the input shaft 311.

The sun gear 312 is an external gear provided on the input shaft 311, and rotates integrally with the input shaft 311 about the same rotation axis.

The plurality of planetary pinion shafts 313 are disposed at equal intervals in a circumferential direction along an outer peripheral surface of the sun gear 312 in a manner of being oriented in the left-right direction parallel to the input shaft 311 on a radial direction outer side of the sun gear 312. More specifically, in the present embodiment, four planetary pinion shafts 313 are disposed at intervals of 90 degrees in the circumferential direction along the outer peripheral surface of the sun gear 312.

The stepped pinion 314 including a first planetary gear 314a and a second planetary gear 314b that rotate integrally is pivotally supported by each planetary pinion shaft 313 in a freely rotatable manner.

The first planetary gear 314a is an external gear that is disposed on the outer peripheral surface of the sun gear 312 and meshes with the sun gear 312.

The second planetary gear 314*b* is an external gear that is disposed on an inner peripheral surface of the ring gear 317 and meshes with the ring gear 317.

The planetary carrier 316 connects the planetary pinion shafts 313. The planetary carrier 316 is rotatable about a rotation axis coaxial with the input shaft 311 (and the sun gear 312) integrally with the planetary pinion shafts 313.

Therefore, the stepped pinion 314 including the first planetary gear 314*a* and the second planetary gear 314*b* is freely rotatable about the planetary pinion shaft 313 as an axis, and is freely revolvable about the rotation axis coaxial with the input shaft 311 (and the sun gear 312) integrally with the planetary pinion shaft 313. The planetary carrier 316 rotates integrally with a revolutionary motion of the stepped pinion 314 on the rotation axis coaxial with the input shaft 311 (and the sun gear 312).

The ring gear 317 is an annular internal gear whose inner peripheral surface meshes with each second planetary gear 314*b*. In the present embodiment, the ring gear 317 is fixed to the drive unit case 11, and the ring gear 317 does not rotate.

The differential gear mechanism 32 includes a differential case 321, a differential pinion shaft 322 supported by the differential case 321, a first bevel gear 323*a* and a second bevel gear 323*b* pivotally supported by the differential pinion shaft 322 in a freely pivotable manner, a left side gear 324L and a right side gear 324R meshing with the first bevel gear 323*a* and the second bevel gear 323*b*, and the left drive shaft 325L and a right drive shaft 325R.

The differential case 321 is formed integrally with the planetary carrier 316 of the planetary gear mechanism 31. Therefore, the differential case 321 rotates about the rotation axis coaxial with the input shaft 311 integrally with the planetary carrier 316 of the planetary gear mechanism 31.

Next, a power transmission path of power output from the drive motor 20 will be described.

The power generated by the drive motor 20 is output from the drive shaft 21, and the drive sprocket 21*a* attached to the drive shaft 21 rotates integrally with the drive shaft 21. When the drive sprocket 21*a* rotates, the driven sprocket 311*a* rotates due to the power transmission chain 40 wound around the drive sprocket 21*a* and the driven sprocket 311*a* attached to the input shaft 311 of the planetary gear mechanism 31. The input shaft 311 of the planetary gear mechanism 31 rotates integrally with the driven sprocket 311*a*. At this time, since the number of teeth of the driven sprocket 311*a* is larger than the number of teeth of the drive sprocket 21*a*, the rotation of the drive shaft 21 is reduced via the drive sprocket 21*a*, the power transmission chain 40, and the driven sprocket 311*a*, and is input to the input shaft 311 of the planetary gear mechanism 31.

In the planetary gear mechanism 31, the power input to the input shaft 311 is transmitted to the stepped pinion 314 via the sun gear 312. The stepped pinion 314 rotates while revolving. The planetary carrier 316 rotates integrally with the revolution of the stepped pinion 314. In the planetary gear mechanism 31, since the ring gear 317 is fixed, the rotation of the input shaft 311 is reduced at a predetermined reduction ratio and transmitted to the planetary carrier 316.

In the differential gear mechanism 32, the differential case 321 is formed integrally with the planetary carrier 316 of the planetary gear mechanism 31, and thus rotates integrally with the rotation of the planetary carrier 316. Therefore, the power input to the input shaft 311 of the planetary gear mechanism 31 is reduced at the predetermined reduction ratio and input to the differential case 321 via the planetary carrier 316.

Therefore, the power output from the drive shaft 21 is input to the differential case 321 of the differential gear mechanism 32 via the power transmission chain 40 and the planetary gear mechanism 31, and the differential pinion shaft 322 revolves about the rotation axis of the differential case 321 together with the differential case 321.

When the vehicle V travels straight, there is no rotation difference between the left and right rear wheels RW, and thus the left side gear 324L and the right side gear 324R that mesh with the first bevel gear 323*a* and the second bevel gear 323*b* rotate according to rotation of the differential pinion shaft 322. The left rear wheel RW rotates when the left drive shaft 325L rotates integrally with the rotation of the left side gear 324L, and the right rear wheel RW rotates when the right drive shaft 325R rotates integrally with the rotation of the right side gear 324R.

When the vehicle V turns, the differential pinion shaft 322 revolves, the first bevel gear 323*a* and the second bevel gear 323*b* rotate such that a rotation speed of the rear wheel RW on an inner side during turning decreases whereas a rotation speed of the rear wheel RW on an outer side during turning increases, and meanwhile, the left side gear 324L and the right side gear 324R that mesh with the first bevel gear 323*a* and the second bevel gear 323*b* rotate at different rotation speeds such that the rotation speed of the rear wheel RW on the inner side during turning decreases whereas the rotation speed of the rear wheel RW on the outer side during turning increases. The left rear wheel RW rotates when the left drive shaft 325L rotates integrally with the rotation of the left side gear 324L, and the right rear wheel RW rotates when the right drive shaft 325R rotates integrally with the rotation of the right side gear 324R. Therefore, when the vehicle V turns, the left drive shaft 325L and the right drive shaft 325R rotate such that the rotation speed of the rear wheel RW on the inner side during turning decreases whereas the rotation speed of the rear wheel RW on the outer side during turning increases.

In this way, as indicated by arrows in FIG. 3, the power output from the drive motor 20 is reduced via the drive sprocket 21*a*, the driven sprocket 311*a*, and the power transmission chain 40, then is input to the deceleration device 30, is further reduced by the planetary gear mechanism 31, and the power is appropriately distributed and transmitted to the left and right rear wheels RW by the differential gear mechanism 32.

[Planetary Carrier and Differential Case]

Next, the planetary carrier 316 and the differential case 321 will be described in more detail.

Figure 5:
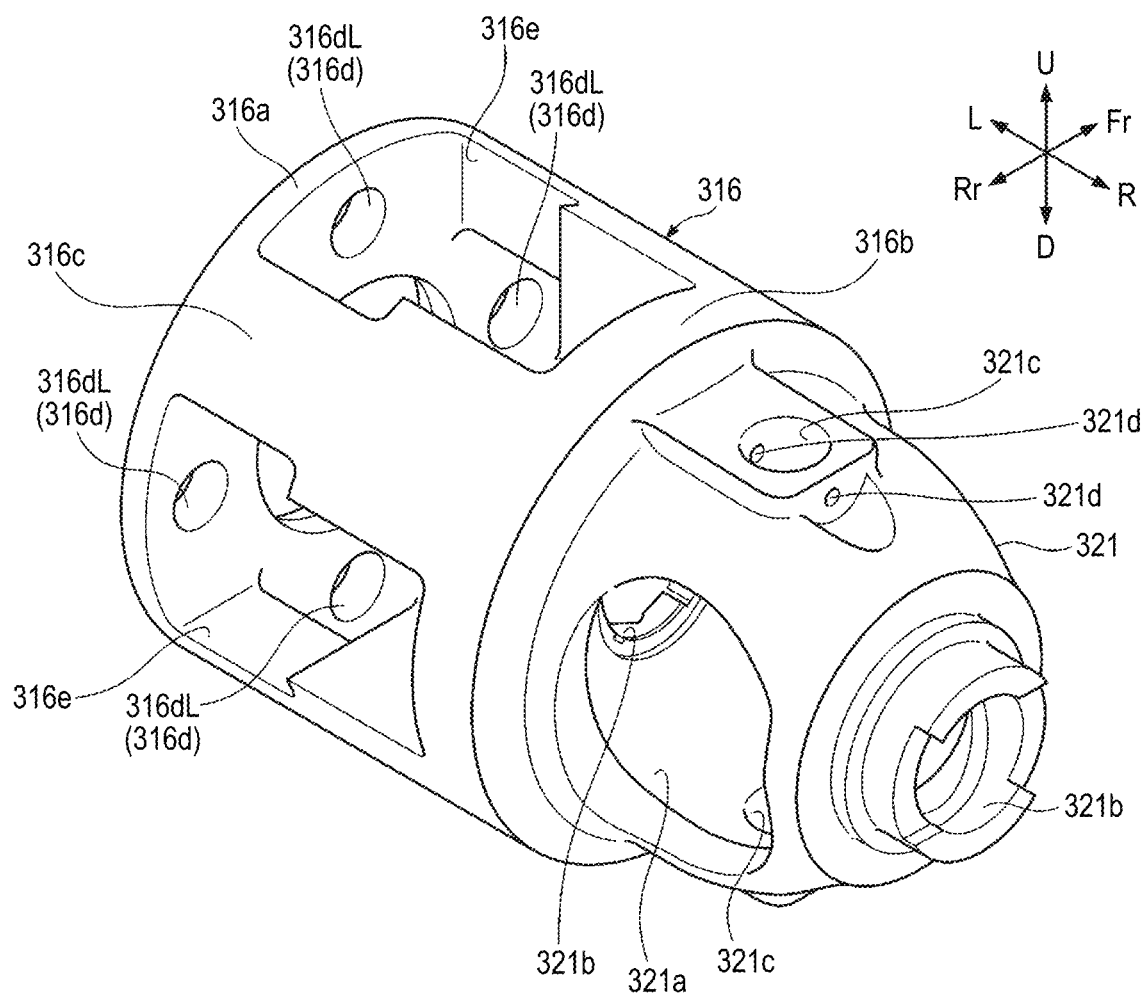
FIG. 5 is a perspective view as viewed from a rear side of a planetary carrier 316 of a planetary gear mechanism 31 and a differential case 321 of a differential gear mechanism 32 provided in the deceleration device 30.

As shown in FIG. 5, the planetary carrier 316 is provided on the left side of the differential case 321 in a state of being aligned in the left-right direction that is the rotation axis direction of the differential case 321. The planetary carrier 316 includes an annular left wall portion 316*a* and an annular right wall portion 316*b* facing each other in the left-right direction, and a cylindrical outer peripheral wall 316*c* connecting the annular left wall portion 316*a* and the annular right wall portion 316*b*.

Each of the left wall portion 316*a* and the right wall portion 316*b* is provided with the pinion shaft insertion hole 316*d* through which each of the plurality of planetary pinion shafts 313 is inserted. More specifically, in the present embodiment, in order to dispose the four planetary pinion shafts 313 at intervals of 90 degrees in the circumferential direction, four pinion shaft insertion holes 316*d* are provided in the left wall portion 316*a* and the right wall portion 316*b* at intervals of 90 degrees to correspond to the four planetary pinion shafts 313, respectively. Hereinafter, the pinion shaft insertion hole 316d provided in the left wall portion 316a is also referred to as a "pinion shaft insertion hole 316dL", and the pinion shaft insertion hole 316d provided in the right wall portion 316b is also referred to as a "pinion shaft insertion hole 316dR".

Figure 6:
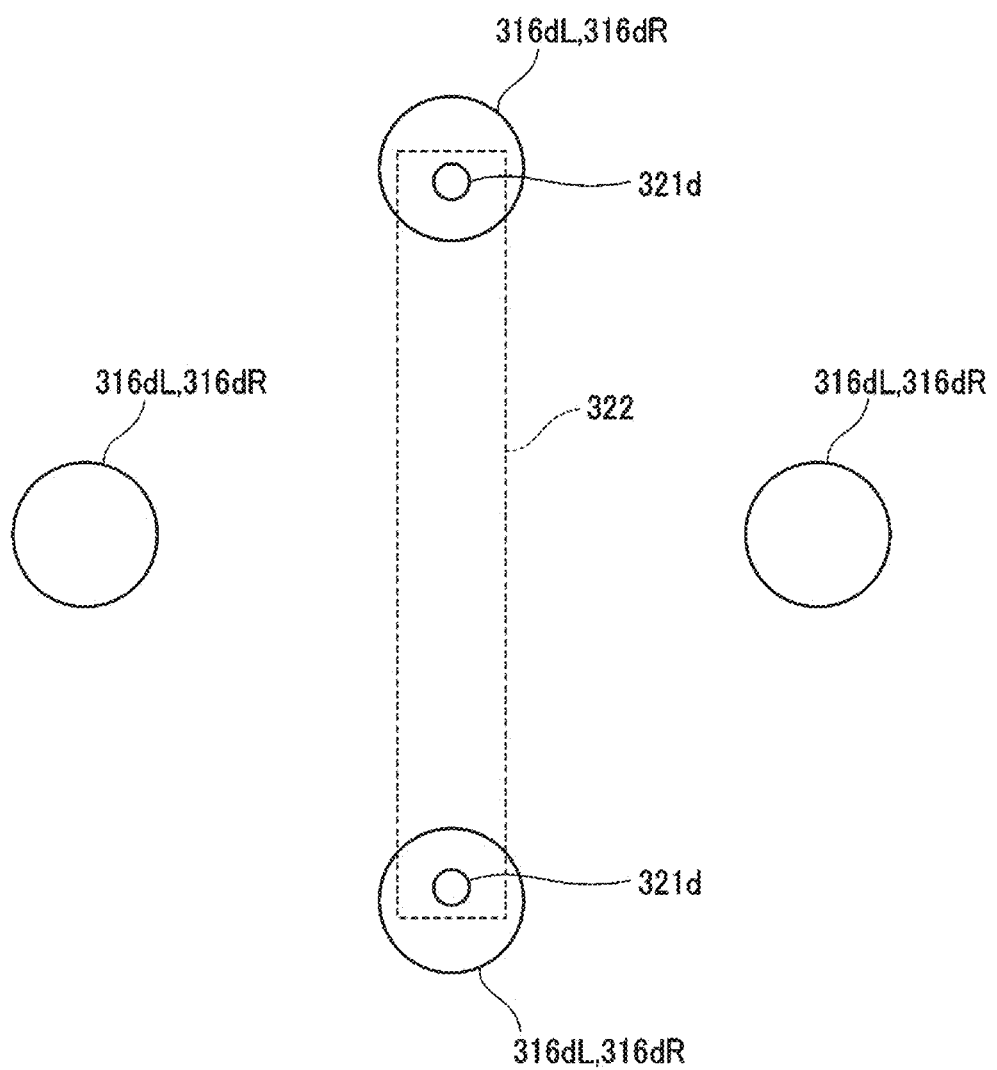
FIG. 6 is a schematic diagram showing a first example of a positional relationship between a pinion shaft insertion hole 316d of the planetary carrier 316 and a fixing pin insertion hole 321d of the differential case 321 when the planetary carrier 316 and the differential case 321 are viewed in a left-right direction.

FIG. 6 shows a first example of a positional relationship between the pinion shaft insertion hole 316d of the planetary carrier 316 and a fixing pin insertion hole 321d (to be described later) of the differential case 321 when the planetary carrier 316 and the differential case 321 are viewed in the left-right direction. In FIG. 6, a broken line denoted by reference numeral 322 indicates the differential pinion shaft 322 attached to the differential case 321.

As shown in FIG. 6, the pinion shaft insertion holes 316dL in the left wall portion 316a and the pinion shaft insertion holes 316dR in the right wall portion 316b face each other in the left-right direction. The four planetary pinion shafts 313 are attached to the planetary carrier 316 by being inserted into the corresponding pair of left and right pinion shaft insertion holes 316d (the pinion shaft insertion holes 316dL and the pinion shaft insertion holes 316dR).

As shown in FIG. 5, the outer peripheral wall 316c is provided with openings 316e for exposing, to the outside of the planetary carrier 316, a part of an outer peripheral surface of the stepped pinion 314 (the first planetary gear 314a and the second planetary gear 314b) pivotally supported by the respective planetary pinion shafts 313 attached to the planetary carrier 316. The openings 316e are provided at positions corresponding to the stepped pinion 314 pivotally supported by the respective planetary pinion shafts 313 in a radial direction about the rotation axis of the differential case 321.

As shown in FIG. 5, the differential case 321 includes an accommodating portion 321a. The accommodating portion 321a accommodates the differential pinion shaft 322, the first bevel gear 323a, the second bevel gear 323b, the left side gear 324L, and the right side gear 324R described above.

The differential case 321 includes a pair of left and right drive shaft insertion holes 321b that communicate with the accommodating portion 321a from the left-right direction that is the rotation axis direction of the differential case 321 and through which the left drive shaft 325L and the right drive shaft 325R are inserted, and a pair of differential pinion shaft insertion holes 321c that communicate with the accommodating portion 321a and through which the differential pinion shaft 322 is inserted. The pair of differential pinion shaft insertion holes 321c communicate with substantially a center of the accommodating portion 321a in the left-right direction that is the rotation axis direction of the differential case 321, and are orthogonal to the rotation axis of the differential case 321.

Further, the differential case 321 is provided with the fixing pin insertion hole 321d through which a fixing pin 400 (see FIG. 7) for fixing the differential pinion shaft 322 to the differential case 321 is inserted. The fixing pin insertion hole 321d is parallel to the rotation axis of the differential case 321 and orthogonal to the pair of differential pinion shaft insertion holes 321c.

Figure 7:
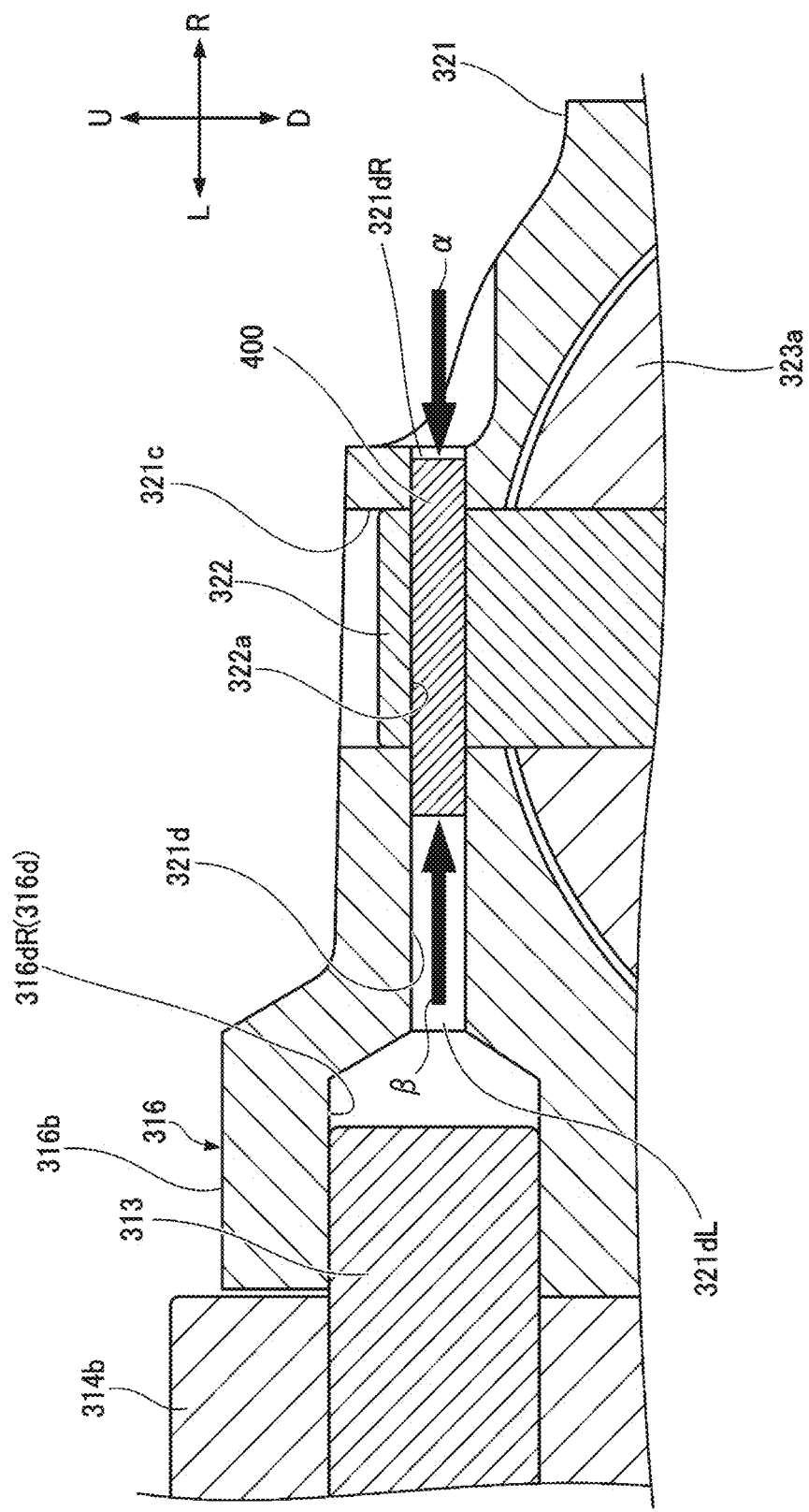
FIG. 7 is a partial cross-sectional view of the drive unit 10 taken along a plane parallel to a differential pinion shaft 322 and a fixing pin 400 attached to the differential case 321.

As shown in FIG. 7, the fixing pin 400 is inserted through the fixing pin insertion hole 321d of the differential case 321 and a fixing pin insertion hole 322a provided in the vicinity of an end of the differential pinion shaft 322, thereby restricting the differential pinion shaft 322 from rotating about an axis orthogonal to the rotation axis of the differential case 321 or moving along a direction of the axis.

In the present embodiment, as shown in FIG. 6, the fixing pin insertion hole 321d of the differential case 321 is provided at a position overlapping any one of the pinion shaft insertion holes 316d provided in the planetary carrier 316 when the planetary carrier 316 and the differential case 321 are viewed in the left-right direction. As shown in FIG. 7, a left end 321dL of the fixing pin insertion hole 321d communicates with one pinion shaft insertion hole 316dR provided in the right wall portion 316b of the planetary carrier 316, and a right end 321dR of the fixing pin insertion hole 321d communicates with the outside of the differential case 321 on a side opposite to the planetary carrier 316.

According to such a configuration of the present embodiment, when the fixing pin 400 that fixes the differential pinion shaft 322 to the differential case 321 is attached to the differential case 321, the fixing pin 400 can be attached to the differential case 321 by inserting the fixing pin 400 into the fixing pin insertion hole 321d from the right side of the differential case 321 as indicated by an arrow denoted by reference numeral a in FIG. 7. When the fixing pin 400 attached to the differential case 321 is to be detached, the planetary pinion shaft 313 inserted through the pinion shaft insertion hole 316dR communicating with the fixing pin insertion hole 321d is appropriately detached as indicated by an arrow denoted by reference numeral B in FIG. 7, and then the fixing pin 400 in the fixing pin insertion hole 321d is pushed out to the right of the differential case 321 through the pinion shaft insertion hole 316dR, and thus the fixing pin 400 can be easily detached from the differential case 321.

Therefore, according to the configuration of the present embodiment, even when the differential pinion shaft 322 is detached from the differential case 321 at the time of assembling or inspection of the differential gear mechanism 32 or the like, the differential pinion shaft 322 can be detached from the differential case 321 without breaking the differential case 321, the fixing pin 400, the differential pinion shaft 322, and the like, and such components can be reused.

Further, since the pinion shaft insertion hole 316dR (that is, the pinion shaft insertion hole 316d) communicating with the fixing pin insertion hole 321d can be used as a hole to be used when the fixing pin 400 is pushed out from the differential case 321, it is not necessary to provide any extra hole (a hole used only when the fixing pin 400 is pushed out from the differential case 321) in the differential case 321, and a decrease in strength of the differential case 321 and the planetary carrier 316 caused by providing such a hole can be avoided.

According to the configuration of the present embodiment, since the fixing pin insertion hole 321d of the differential case 321 and the pinion shaft insertion hole 316d of the planetary carrier 316 communicate with each other, for example, when the planetary pinion shaft 313 is attached to or detached from the planetary carrier 316, the fixing pin insertion hole 321d communicating with the pinion shaft insertion hole 316d through which the planetary pinion shaft 313 is inserted functions as a so-called "air vent hole" and enables easy attachment and detachment of the planetary pinion shaft 313. Similarly, when the fixing pin 400 is attached to or detached from the differential case 321, the pinion shaft insertion hole 316d communicating with the fixing pin insertion hole 321d through which the fixing pin 400 is inserted functions as an air vent hole and enables easy attachment and detachment of the fixing pin 400.

As described above, according to the present embodiment, even after the fixing pin 400 that fixes the differential pinion shaft 322 to the differential case 321 is attached to the differential case 321, the fixing pin 400 can be easily detached from the differential case 321.

Although an embodiment of the present invention has been described above, it goes without saying that the present invention is not limited to the embodiment. It is apparent that those skilled in the art can conceive of various modifications and alterations within the scope described in the claims, and it is understood that such modifications and alterations naturally fall within the technical scope of the present invention. The constituent elements in the embodiment described above may be combined freely in a scope not departing from the gist of the invention.

For example, when the differential pinion shaft 322 is fixed to the differential case 321 by one fixing pin 400, one fixing pin insertion hole 321d may be provided. Alternatively, even in the case where the differential pinion shaft 322 is fixed to the differential case 321 by one fixing pin 400, a plurality of fixing pin insertion holes 321d may be provided as shown in FIG. 6 and the like, and actually, there may be fixing pin insertion holes 321d through which the fixing pin 400 is not inserted.

In the example described above, the four pinion shaft insertion holes 316d are provided at intervals of 90 degrees along the circumferential direction in the left wall portion 316a and the right wall portion 316b, but the configuration is not limited thereto. That is, as long as the fixing pin insertion hole 321d of the differential case 321 is provided at a position overlapping any one of the pinion shaft insertion holes 316d provided in the planetary carrier 316 when the planetary carrier 316 and the differential case 321 are viewed in the left-right direction and communicates with the pinion shaft insertion hole 316d, the number of pinion shaft insertion holes 316d is not limited to four.

Figure 8:
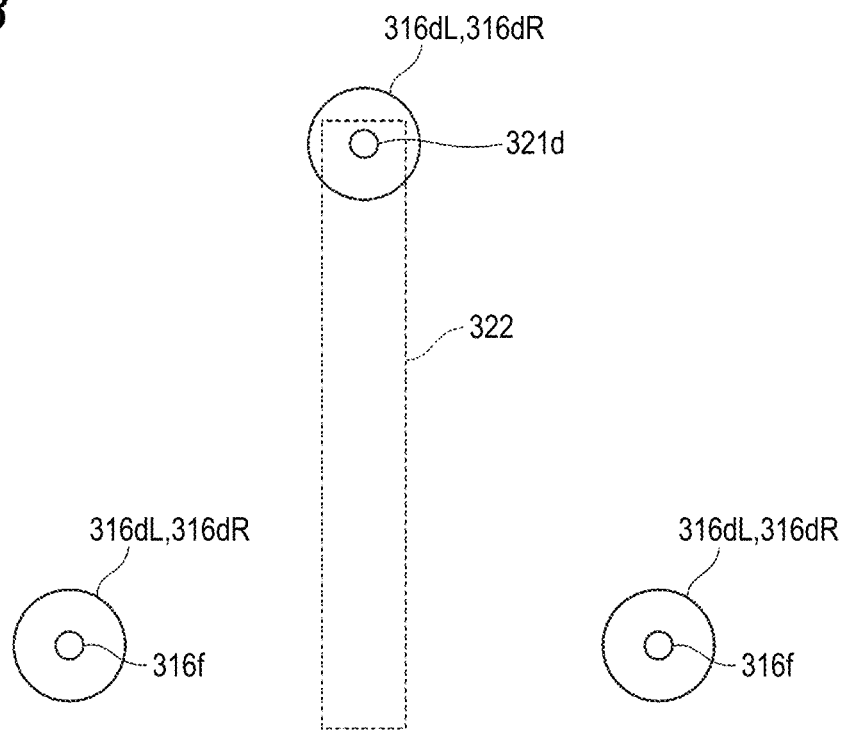
FIG. 8 is a schematic diagram showing a second example of the positional relationship between the pinion shaft insertion hole 316d of the planetary carrier 316 and the fixing pin insertion hole 321d of the differential case 321 when the planetary carrier 316 and the differential case 321 are viewed in the left-right direction.

As an example, as shown in FIG. 8, three pinion shaft insertion holes 316d may be provided in each of the left wall portion 316a and the right wall portion 316b at intervals of 120 degrees along the circumferential direction. As another example, as shown in FIG. 9, five pinion shaft insertion holes 316d may be provided in each of the left wall portion 316a and the right wall portion 316b at intervals of 72 degrees along the circumferential direction.

The number of the differential pinion shafts 322 attached to the differential case 321 is not limited to one, and may be two, for example. In this case, the fixing pin insertion hole 321d through which the fixing pin 400 for fixing each differential pinion shaft 322 to the differential case 321 is inserted communicates with any one of the pinion shaft insertion holes 316d.

Figure 9:
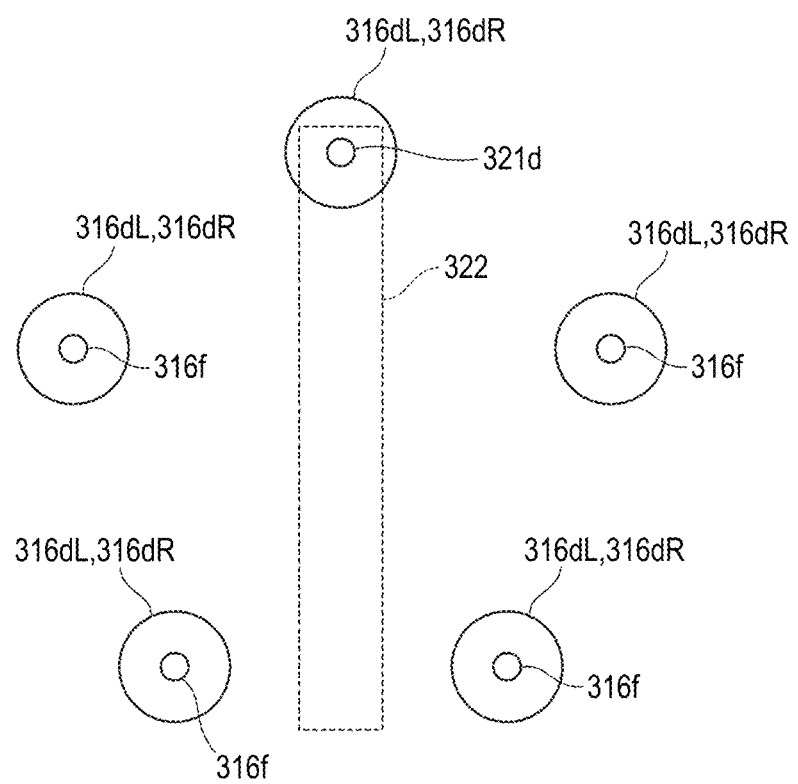
FIG. 9 is a schematic diagram showing a third example of the positional relationship between the pinion shaft insertion hole 316d of the planetary carrier 316 and the fixing pin insertion hole 321d of the differential case 321 when the planetary carrier 316 and the differential case 321 are viewed in the left-right direction.

For example, as shown in FIGS. 8 and 9, a dummy hole 316f may be further provided at a position overlapping the pinion shaft insertion hole 316d other than the pinion shaft insertion hole 316d communicating with the fixing pin insertion hole 321d when the differential case 321 is viewed in the left-right direction. In this case, similarly to the fixing pin insertion hole 321d, one end of the dummy hole 316f communicates with the corresponding pinion shaft insertion hole 316d (pinion shaft insertion hole 316dR), and the other end communicates with the outside of the differential case 321 on the side opposite to the planetary carrier 316. By providing such a dummy hole 316f, the dummy hole 316f communicating with each pinion shaft insertion hole 316d functions as an air vent hole and enables easy attachment and detachment of the planetary pinion shaft 313.

In this specification, at least the following matters are described. Although corresponding constituent elements or the like in the embodiment described above are shown in parentheses, the present invention is not limited thereto.

(1) A power transmission device (drive unit 10) including:
a planetary gear mechanism (planetary gear mechanism 31); and
a differential gear mechanism (differential gear mechanism 32), in which
the planetary gear mechanism includes a planetary carrier (planetary carrier 316) provided a pinion shaft insertion hole (pinion shaft insertion hole 316d) through which a planetary pinion shaft (planetary pinion shaft 313) is inserted, the planetary pinion shaft pivotally supporting a planetary gear (stepped pinion 314, first planetary gear 314a, second planetary gear 314b),
the differential gear mechanism includes a differential case (differential case 321) supporting a differential pinion shaft (differential pinion shaft 322),
the differential case
is formed in one piece with the planetary carrier in a state of being aligned with the planetary carrier in a rotation axis direction of the differential case, and
is provided:
a differential pinion shaft insertion hole (differential pinion shaft insertion hole 321c) through which the differential pinion shaft is inserted, the differential pinion shaft insertion hole being orthogonal to a rotation axis of the differential case; and
a fixing pin insertion hole (fixing pin insertion hole 321d) through which a fixing pin is inserted, the fixing pin insertion hole being parallel to the rotation axis of the differential case and orthogonal to the differential pinion shaft insertion hole, and the fixing pin fixing the differential pinion shaft inserted in the differential pinion shaft insertion hole to the differential case, and
the fixing pin insertion hole is provided at a position overlapping the pinion shaft insertion hole when the planetary carrier and the differential case are viewed from the rotation axis direction, one end (left end 321dL) of the fixing pin insertion hole communicates with the pinion shaft insertion hole, and another end (right end 321dR) thereof communicates with outside of the differential case on a side opposite to the planetary carrier.

According to (1), since the one end of the fixing pin insertion hole through which the fixing pin for fixing the differential pinion shaft to the differential case is inserted communicates with the pinion shaft insertion hole of the planetary carrier and the other end communicates with outside of the differential case on a side opposite to the planetary carrier, the fixing pin in the fixing pin insertion hole is pushed out to the outside of the differential case through the pinion shaft insertion hole of the planetary carrier, and thus the fixing pin can be easily removed from the differential case.

What is claimed is:
1. A power transmission device comprising:
a planetary gear mechanism; and
a differential gear mechanism, wherein
the planetary gear mechanism includes a planetary carrier provided a pinion shaft insertion hole through which a planetary pinion shaft is inserted, the planetary pinion shaft pivotally supporting a planetary gear,
the differential gear mechanism includes a differential case supporting a differential pinion shaft,
the differential case
is formed in one piece with the planetary carrier in a state of being aligned with the planetary carrier in a rotation axis direction of the differential case, and is provided:
- a differential pinion shaft insertion hole through which the differential pinion shaft is inserted, the differential pinion shaft insertion hole being orthogonal to a rotation axis of the differential case; and
- a fixing pin insertion hole through which a fixing pin is inserted, the fixing pin insertion hole being parallel to the rotation axis of the differential case and orthogonal to the differential pinion shaft insertion hole, and the fixing pin fixing the differential pinion shaft inserted in the differential pinion shaft insertion hole to the differential case, and the fixing pin insertion hole is provided at a position overlapping the pinion shaft insertion hole when the planetary carrier and the differential case are viewed from the rotation axis direction, wherein a center point of the fixing pin is radially aligned with a center point of the planetary pinion shaft, one end of the fixing pin insertion hole communicates with the pinion shaft insertion hole, and another end thereof communicates with outside of the differential case on a side opposite to the planetary carrier.

* * * * *